(No Model.)
W. A. LEECH.
FEED TROUGH.
No. 471,868. Patented Mar. 29, 1892.
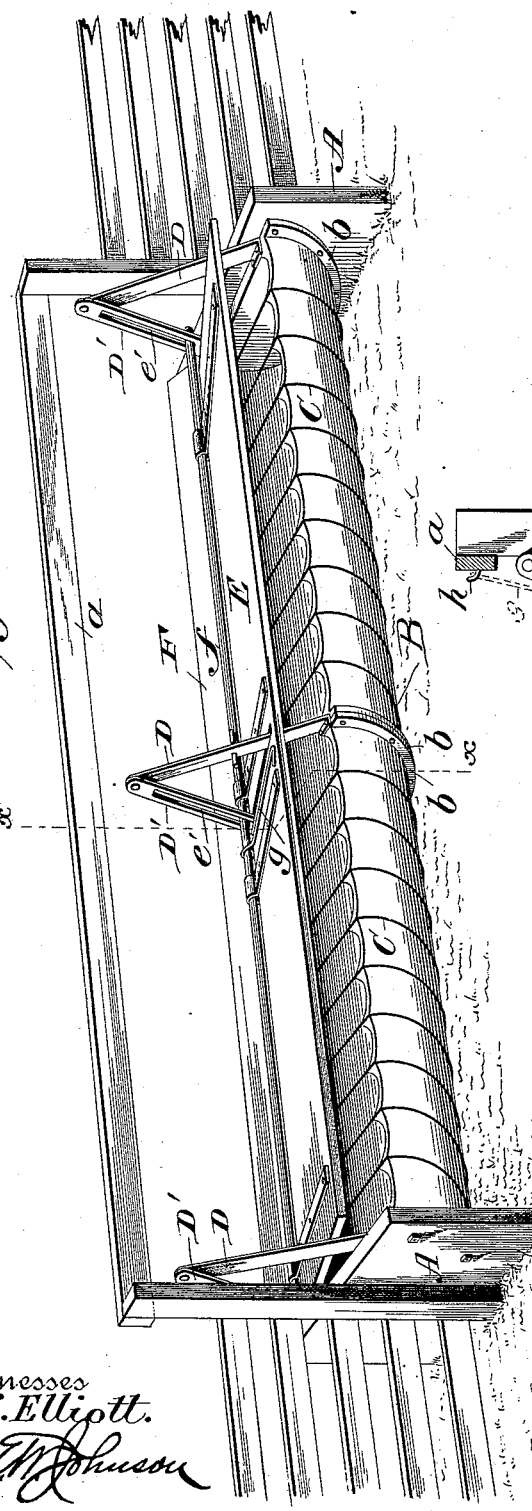
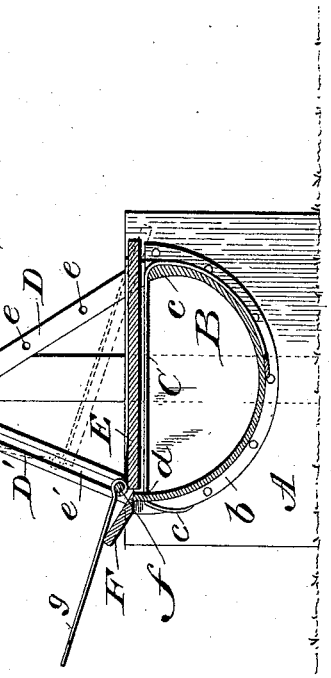
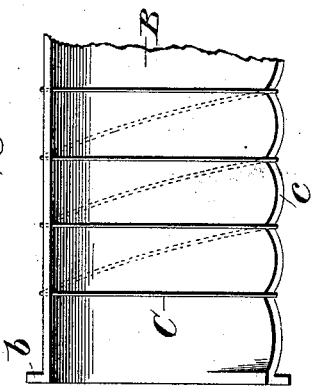
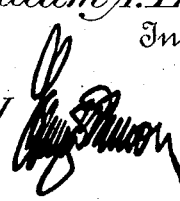
William A. Leech,
Inventor

United States Patent Office.

WILLIAM A. LEECH, OF LAMAR, MISSOURI.

FEED-TROUGH.

SPECIFICATION forming part of Letters Patent No. 471,868, dated March 29, 1892.

Application filed December 30, 1891. Serial No. 416,577. (No model.)

*To all whom it may concern:*

Be it known that I, WILLIAM A. LEECH, a citizen of the United States of America, residing at Lamar, in the county of Barton and State of Missouri, have invented certain new and useful Improvements in Feed-Troughs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in feed-troughs; and it consists in the construction and combination of the parts, as will be hereinafter fully set forth, and particularly pointed out in the claims.

In the accompanying drawings, forming part of this specification, Figure 1 is a perspective view of a feed-trough constructed in accordance with my invention. Fig. 2 is a sectional view through the line $x\ x$ of Fig. 1, showing the cover in a position to close the trough in full lines and in dotted lines in an elevated position. Fig. 3 is a plan view of a portion of the trough detached.

A A designate the end supports of the trough against which the posts of a fence or pen abut, said posts being connected by a beam $a$. The trough B is preferably made up of metallic sections cast so as to provide at their ends flanges $b$, which are apertured for the reception of bolts to connect the sections to each other or to the supports A. The sections of the trough are substantially semicircular in cross-section and have a straight rear upper edge, while the upper front edge $c$ is scalloped or indented to receive and retain a wire C, which is wrapped around the trough so as to extend across the upper edges of the same and is adapted to prevent the animals getting into said trough. The wire lies within the recesses in the front edges of the trough and passes through perforations $d$ in the rear wall of the trough below the upper edge thereof. By this means the wires are held securely in place and not only serve the purpose of fenders, but give greater rigidity to the castings and brace the same so as to permit less material to be used in the manufacture thereof. Adjacent to the ends of the sections are bolted or otherwise suitably secured uprights D and D', which are suitably connected to each other at their upper ends. The inclined upright D has suitable perforations $e$, through which pins may be passed for supporting the cover E of the trough at a desired inclination. The rear upright D' is slotted, as shown at $e'$, through which passes a bar $f$, which is embraced by the bent ends of straps attached to the top E. This bar $f$ has also connected thereto a hook $g$, which is adapted to engage with a pin or hook $h$, carried by the bar $a$, so as to hold the cover in the inclined position shown in dotted lines, Fig. 2, when it is desired to pour food into the trough.

F designates an inclined guide board or strip, which is secured to the end pieces A A, so that its edge will rest upon the rear upper edge of the trough.

By the construction hereinbefore described I provide a trough which is cheaply made, is clean, and in which the cover can be adjusted so as to completely cover the trough or expose the same for filling and for the animals to feed therefrom.

Having thus described my invention, I claim—

1. The improved feed-trough herein described, consisting of metallic sections B and supports therefor, the front edges of said sections being scalloped, and a wire C encircling said trough so that a portion will lie within the scallops of the trough, substantially as set forth.

2. In a feed-trough, the combination of a sction B, having end flanges $b$, front scalloped portions $c$, and perforations or apertures $d$ in the rear wall below the upper edge, and a wire C, substantially as shown, and for the purpose set forth.

3. In a feed-trough, the combination of the supporting-pieces A, a metallic section B, secured thereto, uprights D and D', secured to the section, a rod $f$, passing through the slot in the rear upright D, straps for connecting a cover thereto, and a hook $g$ for holding the cover in an upward and forwardly-inclined position, substantially as set forth.

4. In a feed-trough, the combination of the supports A, semicircular sections B, supported thereby, uprights connected to each other by a bar $a$, inclined uprights D and D', connected to the upper edges of the trough, the upright D', having a slot $e'$, a cover E, connected to a bar $f$, which enters the slots $e'$, a hook $g$, also connected to the bar $f$ and adapted to engage with a pin $h$, carried by the bar $a$, and an inclined board F, attached to the rear upper edge of the trough, the parts being organized substantially as shown.

In testimony whereof I affix my signature in presence of two witnesses.

WILLIAM A. LEECH.

Witnesses:
B. F. CHAPMAN,
WALTER J. MILLER.